United States Patent
Maggiolino (10) Patent No.: US 8,027,138 B2
(45) Date of Patent: Sep. 27, 2011

(54) CAPACITOR SHARING SURGE PROTECTION CIRCUIT

(75) Inventor: Louis Joseph Maggiolino, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/695,477

(22) Filed: Jan. 28, 2010

(65) Prior Publication Data

US 2010/0128407 A1    May 27, 2010

Related U.S. Application Data (63) Continuation of application No. 12/004,417, filed on Dec. 21, 2007, now Pat. No. 7,679,878.

(51) Int. Cl.
| | |
|---|---|
| H01C 7/12 | (2006.01) |
| H02H 1/00 | (2006.01) |
| H02H 1/04 | (2006.01) |
| H02H 3/22 | (2006.01) |

(52) U.S. Cl. ...................................... 361/119
(58) Field of Classification Search .................... 361/119
See application file for complete search history.

(56) References Cited

U.S. PATENT DOCUMENTS

| | | |
|---|---|---|
| 4,990,845 A | 2/1991 | Gord |
| 5,081,379 A | 1/1992 | Korteling |
| 5,220,207 A | 6/1993 | Kovalcik et al. |
| 5,519,310 A | 5/1996 | Bartlett |
| 5,789,971 A | 8/1998 | Colletti et al. |
| 5,838,145 A | 11/1998 | Poon et al. |
| 6,011,413 A | 1/2000 | Hayakawa et al. |
| 6,028,465 A | 2/2000 | So |
| 6,184,659 B1 | 2/2001 | Darmawaskita |
| 6,280,081 B1 | 8/2001 | Blau et al. |
| 6,300,749 B1 | 10/2001 | Castelli et al. |

(Continued)

FOREIGN PATENT DOCUMENTS

WO    WO 2007/084496    7/2007

OTHER PUBLICATIONS

*802.3af TM, IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-ix and 1-121 (133 pages total).

(Continued)

*Primary Examiner* — Dharti Patel
(74) *Attorney, Agent, or Firm* — Sterne, Kessler, Goldstein & Fox P.L.L.C.

(57) ABSTRACT

A capacitor sharing surge protection circuit for protecting multiple ports from harmful energy surges, such as electrostatic discharge (ESD) and cable discharge events (CDE), is provided. The protection circuit includes a plurality of diodes with respective cathodes and anodes. Each anode of the plurality of diodes is coupled to one of the plurality of ports. A bypass capacitor is coupled between the cathodes of the plurality of diodes and ground. In an embodiment, a bulk capacitor is further coupled between the cathodes of the plurality of diodes and ground.

16 Claims, 5 Drawing Sheets

U.S. PATENT DOCUMENTS

| | | | |
|---|---|---|---|
| 6,304,472 | B1 | 10/2001 | Nagasu et al. |
| 6,335,657 | B1 | 1/2002 | Hayase et al. |
| 6,414,404 | B1 | 7/2002 | Allen |
| 6,452,766 | B1 | 9/2002 | Carper |
| 6,456,044 | B1 | 9/2002 | Darmawaskita |
| 6,456,156 | B1 | 9/2002 | Frey et al. |
| 6,600,690 | B1 | 7/2003 | Nahas et al. |
| 6,624,671 | B2 | 9/2003 | Fotouhi |
| 6,717,787 | B2 | 4/2004 | Barker |
| 6,750,701 | B2 | 6/2004 | Kawasumi |
| 6,770,938 | B1 | 8/2004 | Fliesler et al. |
| 6,794,921 | B2 | 9/2004 | Abe et al. |
| 6,798,177 | B1 | 9/2004 | Liu et al. |
| 6,940,737 | B2 | 9/2005 | Nakazawa et al. |
| 6,998,831 | B2 | 2/2006 | Charlon |
| 7,046,983 | B2 | 5/2006 | Elkayam et al. |
| 7,053,699 | B2 | 5/2006 | North |
| 7,098,510 | B2 | 8/2006 | Kodama et al. |
| 7,161,393 | B1 | 1/2007 | Potanin et al. |
| 7,170,194 | B2 | 1/2007 | Korcharz et al. |
| 7,356,588 | B2 | 4/2008 | Stineman et al. |
| 7,372,685 | B2 | 5/2008 | Beck et al. |
| 7,373,528 | B2 | 5/2008 | Schindler |
| 7,417,877 | B2 | 8/2008 | Leung et al. |
| 7,432,696 | B1 | 10/2008 | De Stasi |
| 7,492,108 | B2 | 2/2009 | Garcia et al. |
| 7,525,333 | B1 | 4/2009 | Bertin |
| 2004/0164619 | A1 | 8/2004 | Parker et al. |
| 2006/0045531 | A1 | 3/2006 | Killmeyer et al. |
| 2006/0215343 | A1 | 9/2006 | Camagna et al. |
| 2007/0165345 | A1* | 7/2007 | Woo ................ 361/56 |
| 2007/0165548 | A1 | 7/2007 | Woo et al. |
| 2007/0170909 | A1 | 7/2007 | Vorenkamp et al. |
| 2007/0174527 | A1 | 7/2007 | Vorenkamp |
| 2007/0206774 | A1 | 9/2007 | Vorenkamp et al. |
| 2007/0296391 | A1 | 12/2007 | Bertin et al. |
| 2008/0040625 | A1 | 2/2008 | Vorenkamp et al. |
| 2009/0070615 | A1 | 3/2009 | Maggiolino et al. |
| 2009/0096531 | A1 | 4/2009 | Shimamoto et al. |
| 2009/0115018 | A1* | 5/2009 | Mallikarjunaswamy ..... 257/517 |

OTHER PUBLICATIONS

Final Office Action in U.S. Appl. No. 11/654,031 issued Feb. 26, 2009.

International Search Report for PCT/US2007/001119, filed Jan. 17, 2007, 5 pages.

Mendelson, G., "*All You Need to Know About Power over Ethernet (PoE) and the IEEE 802.3af Standard*," Internet Citation, [Online] Jun. 2004, XP002372480 Retrieved from the Internet: URL:http://www.powerdsine.com/Documentation/WhitePapers/PoE_and_IEEE802_3af.pdf> [retrieved on Mar. 26, 2006].

Non-Final Office Action in U.S. Appl. No. 11/653,875 issued Aug. 25, 2009.

Non-Final Office Action in U.S. Appl. No. 11/653,888 issued Aug. 18, 2009.

Non-Final Office Action in U.S. Appl. No. 11/654,031 issued Aug. 6, 2008.

Non-Final Office Action in U.S. Appl. No. 11/654,031 issued Aug. 24, 2009.

* cited by examiner

CAPACITOR SHARING SURGE PROTECTION CIRCUIT

CROSS-REFERENCE TO RELATED APPLICATION

This application is a continuation of U.S. patent application Ser. No. 12/004,417 filed Dec. 21, 2007 (now allowed), which is incorporated herein by reference in its entirety.

FIELD OF THE INVENTION

The present invention relates generally to surge protection circuits, and more specifically to surge protection circuits for Power over Ethernet (PoE) devices.

BACKGROUND OF THE INVENTION

Ethernet provides high speed data communications between two nodes that operate according to the IEEE 802 Ethernet Standard. The communications medium between the two nodes can be twisted pair wires for Ethernet, or other types of communications mediums that are appropriate. PoE systems provide power and data over a common communications link. More specifically, a power source device (PSE) coupled to the physical layer of a first node of the communications link provides direct current (DC) power (for example, 48 volts DC) to a powered device (PD) at a second node of the communications link. The DC power is transmitted simultaneously over the same communications medium with the high speed data from one node to the other node.

Example PDs that utilize PoE include Internet Protocol (IP) phones, and wireless access points, etc. The PSE typically includes a serializer/deserializer (i.e. SERDES) coupled to a transceiver, and/or a physical-layer (PHY) device, to support high speed serial data transport. Herein, data ports and their corresponding links can be interchangeably referred to as data channels, communication links, data links, etc, for ease of discussion.

PoE integrated circuits are sensitive to harmful surge events, such as electrostatic discharge (ESD) and cable discharge events (CDE). The PHY of a PoE system is particularly susceptible to damage due to ESD and CDE. During these surge events, currents can be extremely high (e.g., 100 amps) and it becomes vital to ensure that voltages do not exceed critical breakdown and spark gap limits of PoE systems and their respective circuits.

An ESD event typically occurs when a device becomes charged as a result of mishandling or improper packaging and then discharged by a sudden connection to ground. CDE, on the other hand, can occur when a charge accumulates on a cable, such as a twisted pair cable used in Ethernet networks, and is connected to an Ethernet port of lower potential. The resulting high-energy discharge may damage the device to which the cable is connected. Coupling of external events, like a lightning strike, is yet another example source of CDE.

Some PoE integrated circuits have a conventional protection circuit to combat detrimental ESD and CDE. These conventional protection circuits discharge electrostatic or harmful surge energy using a capacitor and/or a transient-voltage-suppression (TVS) diode. Unfortunately, when managing ESD and CDE events on multiple ports, conventional PoE protection circuits require at least one capacitor per port to provide a low impedance path to ground, and/or at least one TVS diode per port to supply protection from differential and common mode transients. These capacitors are commonly referred to as bulk capacitors and are typically large and consume a significant amount of circuit board space, as well as contribute to additional cost. Similarly, the need for multiple TVS diodes contributes to circuit board space requirements and cost.

Thus, what is needed is a protection circuit for PoE devices that overcomes the shortcomings described above.

BRIEF SUMMARY OF THE INVENTION

In one embodiment, the present invention includes a plurality of ports and a plurality of diodes. The plurality of diodes including a cathode and an anode. Each anode of the plurality of diodes is coupled to one of the plurality of ports. A bypass capacitor is coupled between the cathodes of the plurality of diodes and ground.

Additional features and advantages of the invention are set forth in the description that follows, and in part are apparent from the description that follows, or may be learned by practice of the invention. The advantages of the invention are realized and attained by the structure and particularly pointed out in the written description and claims hereof as well as the appended drawings.

Both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

The invention is described with reference to the accompanying drawings. The drawing in which an element first appears is typically indicated by the leftmost digit(s) in the corresponding reference number.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure, or characteristic. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments, whether or not explicitly described.

Figure 1:
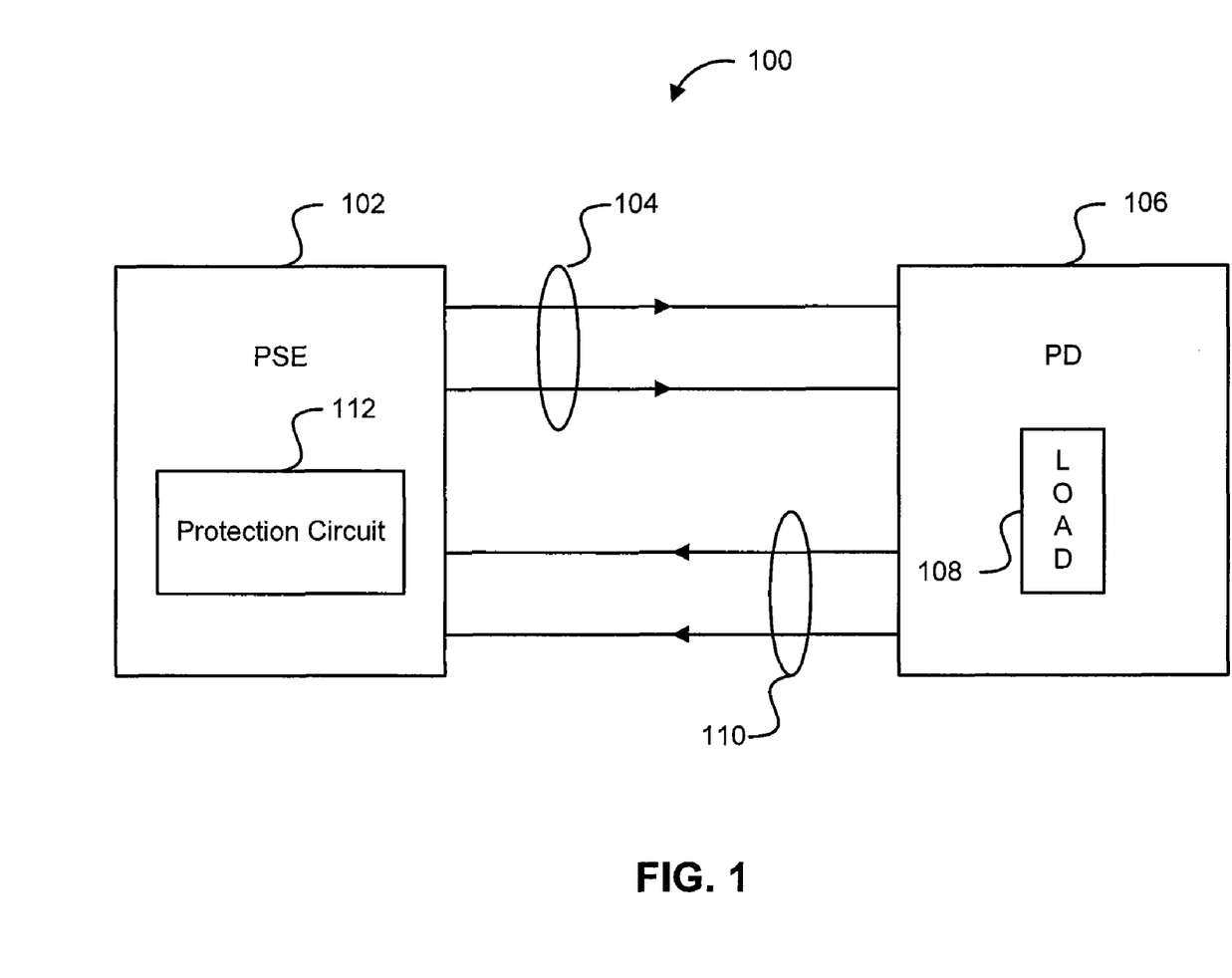
FIG. 1 is a block diagram of a Power over Ethernet (PoE) system.

FIG. 1 illustrates a high level diagram of a Power over Ethernet (PoE) system 100 that provides both DC power and data communications over a common data communications medium. Referring to FIG. 1, power source equipment (PSE) 102 provides DC power over conductors 104, 110 to a powered device (PD) 106 having a representative electrical load 108. PSE 102 and PD 106 also include data transceivers that operate according to a known communications standard, such as the IEEE Ethernet standard. More specifically, PSE 102 includes a physical layer (PHY) device that transmits and receives high speed data with a corresponding PHY device in PD 106. Accordingly, the power transfer between PSE 102 and PD 106 occurs simultaneously with the exchange of high speed data over conductors 104, 110.

In one example, PSE 102 is a data switch having multiple ports that is in communication with one or more PD devices, such as Internet phones or a wireless access point. PSE 102 further includes PoE protection circuit 112. Each port of PSE 102 is protected from harmful electrical energy surges by PoE protection circuit 112, such as ESD and CDE. The structure and operation of PoE protection circuit 112 is explained later with reference to FIGS. 2A, 2B, and 2C.

Conductor pairs 104, 110 can carry high speed differential data communications. In one example, conductor pairs 104, 110 each include one or more twisted wire pairs, or any other type of cable or communications medium capable of carrying the data and DC power transmissions between PSE 102 and PD 106. In Ethernet communications, conductor pairs 104, 110 can include multiple twisted pairs, for example four twisted pairs for 10 Gigabit Ethernet. In 10/100 Ethernet, only two of the four pairs carry data communications and the other two pairs of conductors are unused. Herein, conductor pairs 104, 110 may be referred to as Ethernet cables or communication links for ease of discussion.

Single Substrate

Figure 2A:
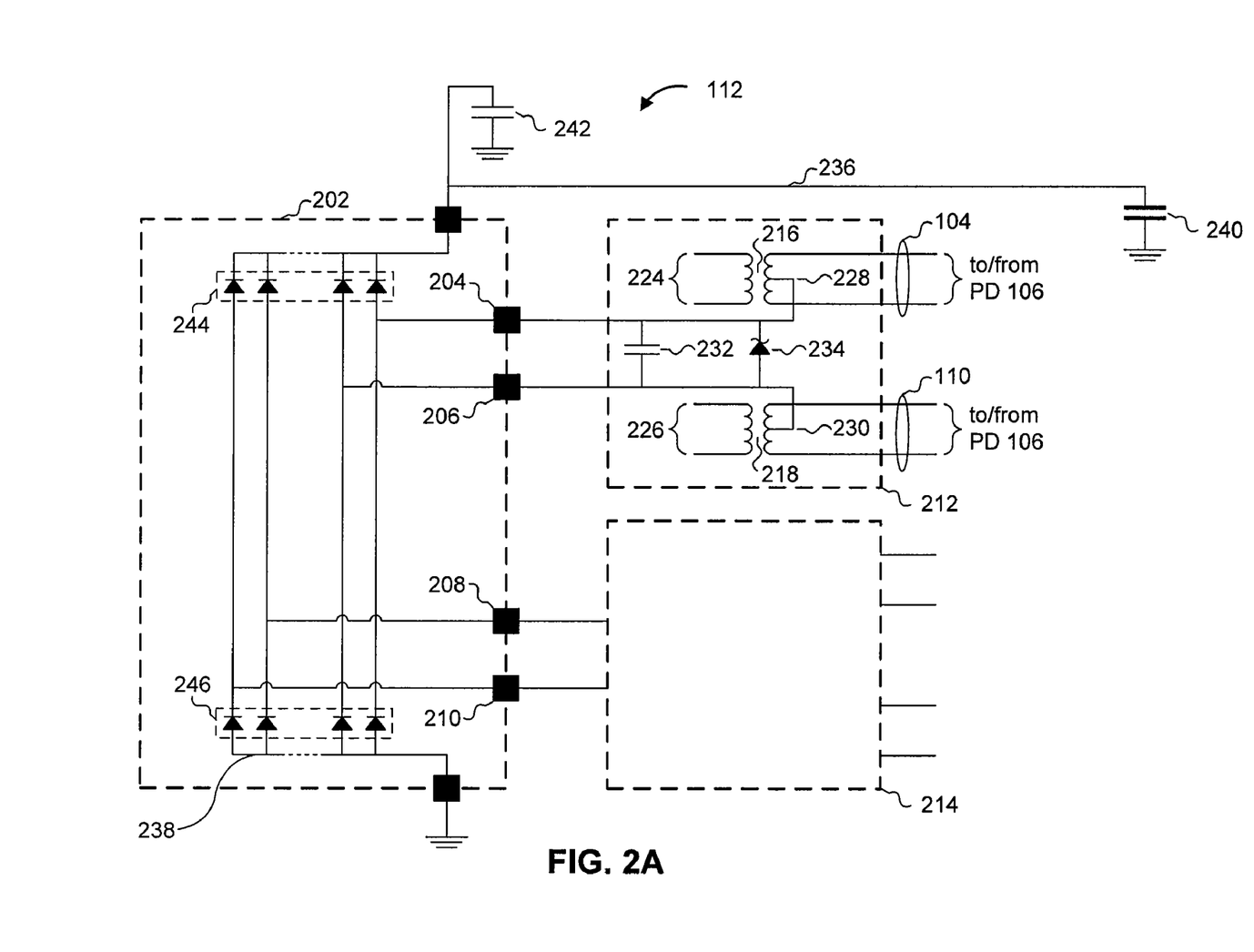
FIG. 2A illustrates one embodiment of a PoE protection circuit for multiple ports using a single substrate.

FIG. 2A illustrates one embodiment of PoE protection circuit 112, shown in FIG. 1. PoE protection circuit 112 protects PSE 102 against harmful electrical energy surges, such as ESD and CDE. These harmful surge events can be both positive and negative in potential. Accordingly, PoE protection circuit 112 may be capable of providing protection from harmful surge events, regardless of the polarity associated with the surge event.

PoE protection circuit 112 desirably has no detrimental affect on normal PoE operation. Thus, protection devices in PoE protection circuit 112 have triggering thresholds that are higher than PoE integrated circuit and board operating voltages. Triggering thresholds are higher than external surge and protection levels to minimize discharge exposure. Conversely, triggering thresholds are lower than spark gap voltages of circuits internal to the PoE integrated circuit so that PoE protection circuit 112 protects these internal circuits.

At least a part of PoE protection circuit 112 is deposited on a substrate 202. Other components are located off substrate 202. Ports couple the on-substrate components with the off-substrate components. The ports include positive power ports 204, 208 and negative power ports 206, 210. Positive port 204 and negative power port 206 comprise a first power port pair, while positive power port 208 and negative power port 210 comprise a second power port pair.

Each respective power port pair couples substrate 202 to a single Ethernet port 212, 214. As illustrated in FIG. 2A, Ethernet port 212 is coupled to power port pair 204, 206, while Ethernet port 214 is coupled to power port pair 208, 210. It will be understood by those skilled in the relevant art(s) that any number of Ethernet ports and respective power port pairs can be present in PoE protection circuit 112. For clarity purposes, the internal circuit implementation is shown for only a single Ethernet port 212.

Ethernet port 212 includes first and second transformers 216 and 218, a transient-voltage-suppression (TVS) diode 234, and a protection buffer capacitor 232. First transformer 216 couples high speed data between a differential transmit port 224 and first conductor pair 104. Likewise, second transformer 218 couples high speed data between a differential receive port 226 and second conductor pair 110. The respective transformers 216, 218 pass high speed data to and from transceiver ports on PSE 102, which may be sensitive to large magnitude voltages.

First transformer 216 includes primary and secondary windings, where the second winding (on conductor pair side 104) includes a center tap 228. Likewise, second transformer 218 includes primary and secondary windings, where the secondary winding (on conductor pair side 110) includes a center tap 230. A DC voltage is supplied across the respective center taps 228, 230 of transformers 216, 218, on the conductor pair sides of the transformers. Transformers 216, 218 isolate the DC voltage from sensitive data ports 224 and 226. An example DC voltage supplied across respective center taps 228, 230 is substantially 48 volts, but other voltages could be used depending on the voltage/power requirements of PD 106. It is important to note that communications signals sent and received over conductor pairs 104 and 110 are differential signals that ideally are not affected by the DC power transfer.

PoE protection circuit 112 protects the PoE integrated circuit against harmful differential electrical energy surges between respective positive and negative power port pairs 204, 206 and 208, 210. These surge events are differential in nature, since the surge couples unevenly or to only one side of the respective power port pairs 204, 206 and 208, 210. During a positive surge event, where a voltage on positive power port 204 is greater than a voltage on negative power port 206 due to ESD or CDE, capacitor 232 charges with surge energy. TVS diode 234 limits the differential voltage between positive power port 204 and negative power port 206. When the reverse bias on TVS diode 234 reaches an avalanche breakdown voltage, current flows from cathode to anode in TVS diode 234.

The breakdown of TVS diode 234 allows for current to flow from positive power port 204 to negative power port 206, limiting the differential voltage between positive power port 204 and negative power port 206. During normal operation, TVS diode 234 is reverse biased, but does not operate in breakdown because the breakdown voltage is greater in magnitude than the nominal, differential voltage between positive power port 204 and negative power port 206. TVS diode 234 may be a transzorb high-power density diode.

During a negative ESD event, where a voltage on negative power port 206 is greater than a voltage on positive power port 204, capacitor 232 charges with surge energy. TVS diode 234 limits a differential voltage between negative power port 206 and positive power port 204. The differential surge voltage forward biases TVS diode 234. Thus, TVS diode 234 conducts to provide a discharge path for the surge event. Providing a discharge path and limiting the differential surge voltage protects the PoE integrated circuit from damage.

Off-substrate components, including transformers 216, 218, protection buffer capacitor 232, and TVS diode 234 are shown in FIG. 2 as being contained within exemplary Ethernet port 212. Persons skilled in the relevant art(s) will appreciate other alternative configurations for Ethernet ports 212, 214. For example, TVS diode 234 and buffer capacitor 232 may be included within each of the Ethernet ports 212, 214 as shown in FIG. 2A, or placed separately on the circuit board on which substrate 202 resides. Each of the Ethernet ports 212, 214 may be an RJ45 port capable of receiving Ethernet communications.

In addition to protecting Ethernet ports 212, 214 from differential ESD and CDE that may damage the sensitive PoE circuitry, protection circuit 112 further protects each Ethernet port 212, 214 from common mode ESD and CDE damage as well. A positive surge bus 236 provides a common surge discharge path in protection circuit 112. In other words, positive surge bus 236 provides a common discharge path for positive electrostatic and cable discharge events from at least one source. Protection circuit 112 further protects each Ethernet port 212, 214 from a negative electrostatic or cable discharge events using negative surge bus 238. Negative surge bus 238 provides a path for negative surge energy to be dissipated.

Positive electrostatic and cable discharge events are sent down common positive surge bus 236 to bulk capacitor 240 and bypass capacitor 242. Bulk capacitor 240 and bypass capacitor 242 decouple low and high frequency energy surges associated with positive surge events, respectively. In the event of a low frequency positive ESD or CDE event, bulk capacitor 240 primarily provides a low-impedance path to ground. Similarly, in the event of a high frequency ESD or CDE event, bypass capacitor 240 primarily provides a low-impedance path to ground. Negative electrostatic and cable discharge events are simply shunted to ground via negative surge bus 238.

Both bulk capacitor 240 and bypass capacitor 242 help to maintain a constant DC voltage and current level by disconnecting or shunting AC signals to ground. The need for multiple capacitors, bulk capacitor 240 and bypass capacitor 242, is partly a result of parasitic elements associated with real capacitors, such as bulk capacitor 240 and bypass capacitor 242. In an embodiment, bulk capacitor 240 contains 10- to 20-times the capacitance of a single bypass capacitor 242 and is typically more suited to handle high current events.

Ethernet ports 212, 214 are coupled to two diode arrays, positive diode array 244 and negative diode array 246. Each power port of Ethernet ports 212, 214 is coupled one cathode of positive diode array 244 and one anode of negative diode array 246. The anodes of positive diode array 244 are coupled to positive surge bus 236. The cathodes of negative diode array, on the other hand, are coupled to negative surge bus 238. The diodes that make up positive and negative diode arrays 242, 244 may be high voltage ESD diodes or equivalent.

When multiple sources of possible ESD and CDE are coupled to positive surge bus 236, positive diode array 244 prevents flow of the surge energy from positive protection bus 236 to Ethernet ports 212, 214. Thus, when a positive electrostatic or cable discharge event occurs on a specific Ethernet port (e.g. Ethernet port 212), other Ethernet ports (e.g., Ethernet 214), coupled to common positive surge bus 236, are unaffected by the positive ESD or CDE and, as a result, do not malfunction. Similarly, negative diode array 246 prevents a negative electrostatic or cable discharge event, coupled to negative surge bus 238, from affecting Ethernet ports connected to negative diode array 246 that were not involved in the surge event.

Positive diode array 244 and positive surge bus 236 allow bulk capacitor 240 and bypass capacitor 242 to be shared among multiple Ethernet ports 212, 214. In conventional designs, each port would require separate bulk and bypass capacitors. In the present invention, however, a single bulk and bypass capacitor can be used for all Ethernet ports 212, 214, reducing board space requirements and cost.

Multiple Substrates

Figure 2B:
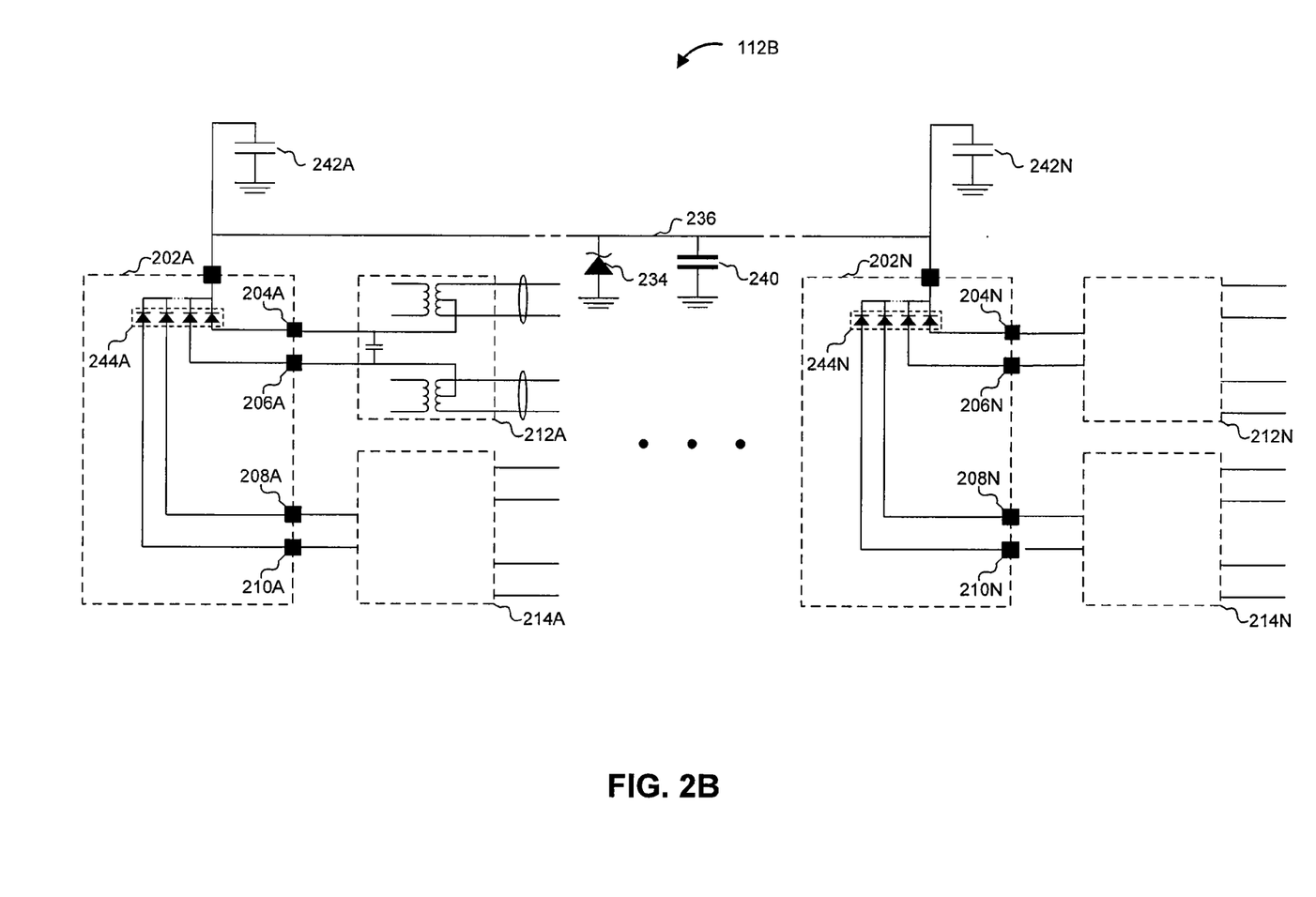
FIG. 2B illustrates one embodiment of a PoE protection circuit for multiple ports implemented using multiple substrates.

FIG. 2B illustrates another exemplary PoE protection circuit 112B.

PoE protection circuit 112B protects PSE device 102 against harmful electrical energy surges, such as ESD and CDE. These harmful surge events can be both positive and negative in potential. Accordingly, PoE protection circuit 112B may be capable of providing protection from harmful surge events, regardless of polarity.

In the illustration of FIG. 2B, PSE device 102 has multiple substrates 202A, . . . N that receive and transmit both data and power through multiple Ethernet ports 212A, . . . N, 214A, . . . N. In one embodiment, FIG. 2B illustrates an example PoE protection circuit 112B for a data switch having multiple ports that are in communication with one or more PD devices 106, such as Internet phones or a wireless access point.

A positive surge bus 236 provides a common path in the protection circuit 112B for all substrates 202A, . . . N. In other words, positive surge bus 236 provides a common discharge path for positive electrostatic and cable discharge events from at least one source. For clarity purposes, only one surge bus 236 is shown for providing a discharge path for positive surge events. However, there may also be a similar discharge path for negative surge events, such as negative surge bus 238 shown in FIG. 2A, that is common to all substrates 202A, . . . N.

Positive electrostatic and cable discharge events are sent down common positive surge bus 236 to a single, shared bulk capacitor 240 and bypass capacitors 242A, . . . N. Bulk capacitor 240 and bypass capacitors 242A, . . . N decouple low and high frequency energy surges associated with ESD and CDE, respectively. In the event of a low frequency surge event, bulk capacitor 240 primarily provides a low-impedance path to ground. Similarly, in the event of a high frequency surge event, bypass capacitors 242A, . . . N primarily provide a low-impedance path to ground.

Both bulk capacitor 240 and bypass capacitors 242A, . . . N help to maintain a constant DC voltage and current level by disconnecting or shunting alternating current (AC) signals to ground. The need for multiple capacitors, bulk capacitor 240 and bypass capacitors 242A, . . . N, is partly a result of parasitic elements associated with real capacitors. In an embodiment, bulk capacitor 240 contains 10- to 20-times the capacitance of a single one of the bypass capacitors 242A, . . . N, and is typically more suited to handle high current issues.

Ethernet ports 212A . . . N, 214A, . . . N are coupled to positive diode arrays 244A, . . . N. Each power port of Ethernet ports 212A, . . . N, 214A, . . . N is coupled to one cathode of positive diode arrays 244A, . . . N. The anodes of positive diode arrays 244A, . . . N are coupled to positive surge bus 236. The diodes that make up positive diode arrays 244A, . . . N may be high voltage ESD diodes or equivalent.

When multiple sources of possible ESD and CDE are coupled to positive protection bus 236, positive diode arrays 244A, . . . N prevent flow of the surge energy from positive surge bus 236 to Ethernet ports 212A, . . . N, 214A, . . . N. Thus, when electrostatic or cable discharge events occur on a specific Ethernet port (e.g., 212A) other Ethernet ports (e.g., 212N), coupled to common positive surge bus 236, are unaffected by the positive electrostatic or cable discharge event and, as a result, do not malfunction.

Positive diode arrays 244A, . . . N and positive surge bus 236 allow bulk capacitor 240 and bypass capacitors 242A, . . . N to be shared among multiple Ethernet ports 212A, . . . N, 214A, . . . N. In conventional designs, each Ethernet port would require a separate bulk and bypass capacitor. In the present invention, however, a single bulk capacitor 240 may be shared among multiple Ethernet ports 212A, . . . N, 214A, . . . N that span multiple substrates 202A, . . . N, reducing board space requirements and cost. Similarly, bypass capacitors 242A, . . . N may be shared by multiple Ethernet ports, further reducing board space requirements and cost. It should be noted, however, that in many designs at least one bypass capacitor per substrate 202A, . . . N may be required, as shown in FIG. 2B. It will be further understood by those skilled in the relevant art(s) that any number of bypass capacitors may be shared between Ethernet ports that span one or more substrates, depending on particular requirements and design.

TVS diode 234, shown in FIG. 2A as a component of Ethernet port 212, can similarly be shared by all Ethernet ports 212A, . . . N, 214A, . . . N of FIG. 2B. Sharing TVS diode 234, among all Ethernet ports 212A, . . . N, 214A, . . . N reduces circuit board space requirements, as well as additional costs. In traditional PoE protection circuits, a TVS diode, similar to TVS diode 234 of FIG. 2B, would be required for each Ethernet port supported. It should be noted that, although not shown in FIG. 2A, TVS diode 234 could have similarly been shared by Ethernet ports 212, 214 in the same manner illustrated in FIG. 2B.

Figure 2C:
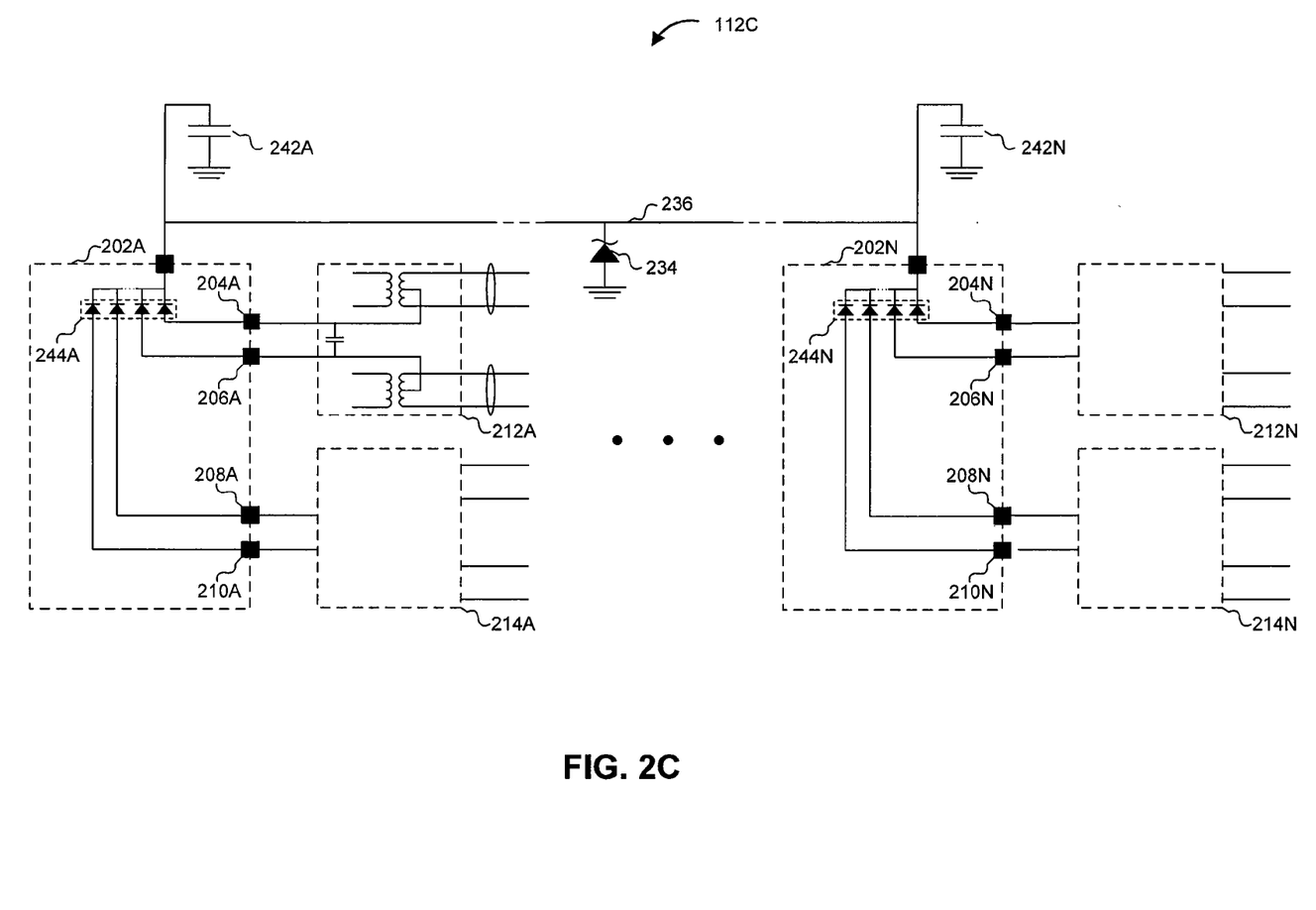
FIG. 2C illustrates another PoE protection circuit for multiple ports implemented using multiple substrates.

FIG. 2C illustrates another exemplary PoE protection circuit 112C, constructed in accordance with the present invention. PoE protection circuit 112C protects PSE device 102 against harmful electrical energy surges, including ESD and CDE. In this embodiment, bulk capacitor 240 has been eliminated.

In an embodiment, for each substrate 202A, . . . N, at least one respective bypass capacitor 242 is provided. Depending on the number of bypass capacitors used in PSE device 102, bulk capacitor 240 may become an optional component. This is attributed to the fact that bypass capacitors 242A, . . . N are placed in a parallel combination via positive surge bus 236 and ground. Consequently, their equivalent parallel capacitance can be equated as follows:

$$C_T = C_{270A} + C_{270B} + \ldots + C_{270N}$$

The total equivalent capacitance $C_T$ of the parallel combination is simply the sum of the capacitances associated with bypass capacitors 242A, . . . N.

As noted above, a typical bulk capacitor 240 has anywhere from 10- to 20-times the capacitance of a single bypass capacitor 242. If, for example, bulk capacitor 240 has a capacitance that is 10 times the capacitance of a single bypass capacitor 242, then 10 bypass capacitors 242A, . . . N will comprise an equivalent parallel capacitance equal to the capacitance of bulk capacitor 240 (assuming each of the bypass capacitors 242A, . . . N has equal capacitance).

Assuming the above is true in this instance, bulk capacitor 240 may be removed, as shown in FIG. 2C. Removing bulk capacitor 240 further reduces circuit board space requirements and cost. Persons skilled in the relevant art(s) will realize that the ratio of the capacitance of bulk capacitor 240 to the capacitance of one bypass capacitors 242 can vary depending on a particular circuit implementation and requirements.

In an embodiment, the parallel combination of bypass capacitors 242A, . . . N has a parasitic equivalent series inductance (ESL) and equivalent series resistance (ESR) that is substantially less than that of bulk capacitor 240. Ideal capacitors, in general, have decreasing impedance as the frequency of a signal applied across the capacitor increases. However, any parasitic inductance associated with a capacitor reduces the effective frequency range of the capacitor in providing a low impedance path to ground.

Looking at the effects of ESL and ESR from a different perspective, the total energy stored by a capacitor can be calculated by the equation:

$$E_T = \frac{1}{2} \cdot C \cdot V_T^2$$

Where $E_T$ is the total energy stored on the capacitor, C is the capacitance of the capacitor, and $V_T$ is the voltage on the capacitor. In an ideal capacitor, the voltage $V_T$ across its terminals is completely due to the capacitance and charge stored on the plates of the capacitor. However, parasitic ESL and ESR further contribute to the voltage $V_T$, effectively reducing the useful energy storage capabilities of the capacitor.

The total voltage across the terminals of the capacitor, including parasitic voltage drops from associated ESL and ESR, may be calculated by the equation:

$$V_T = V_C + \left( C_{ESL} \cdot \frac{dI_C}{dt} \right) + (C_{ESR} \cdot I_C)$$

Where $V_T$ is the total voltage across the terminals of the capacitor, $V_c$ is the voltage drop associated with the capacitance of the capacitor, $C_{ESL}$ is the parasitic series inductance associated with the capacitor, $C_{ESR}$ is the parasitic series resistance associated with the capacitor, and $I_C$ is the current of the signal applied across the capacitor.

It can be seen from the above equation that the faster the current $I_C$ changes, i.e. the higher the frequency of the signal applied across the capacitor, the larger the voltage drop associated with the parasitic inductance $C_{ESL}$ of the capacitor. In addition, the larger the peak current $I_C$ of the signal applied across the capacitor, the larger the voltage drop associated with the parasitic resistance $C_{ESR}$ of the capacitor. Consequently, reducing both ESL and ESR associated with a capacitor, as is achieved by the parallel combination of bypass capacitors 242A, . . . N, effectively permits either an increase in the amount of useful energy stored on the capacitor or a decrease in the size of the capacitor.

Figure 3A:
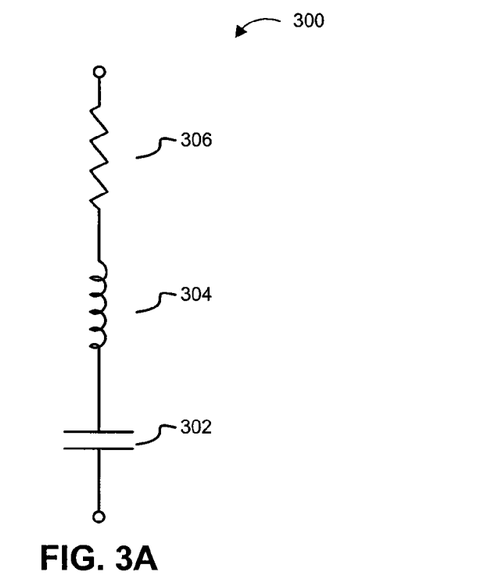
FIG. 3A illustrates an equivalent circuit model for a capacitor.

FIG. 3A illustrates an equivalent model commonly used to describe a capacitor, such as bulk capacitor 240 and bypass capacitors 242A, . . . N. The main component, capacitor 302, has an inductive element 304 and resistive element 306 in series with capacitor 302. Inductive element 304 represents the ESL of capacitor 302. Similarly, resistive element 306 represents the ESR of capacitor 302. The inductive element 304 and resistive element 306 represent parasitic components that contribute to DC and frequency dependent losses of capacitive structure 302.

Capacitor type and structure are leading factors that dictate the value of these parasitic components. Typically, small valued capacitors have less ESL and ESR than larger valued capacitors. In an embodiment, using the smaller, bypass capacitors 242A, . . . N, in place of the larger, bulk capacitor 240, consequently leads to reduced ESL and ESR. The reduction in ESL and ESR from using the smaller valued bypass capacitors 242A, . . . N, in place of bulk capacitor 240, can be as high as 1- to 2-orders of magnitude.

Figure 3B:
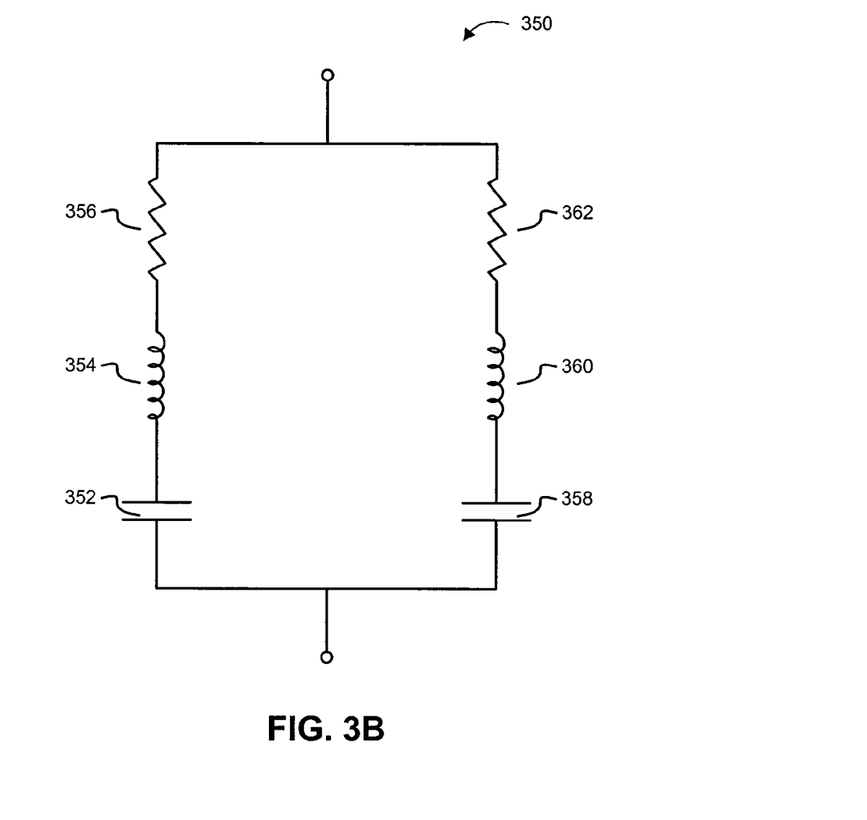
FIG. 3B illustrates a parallel combination of an equivalent circuit model for two capacitors.

Furthermore, because bypass capacitors 242A, ... N are in parallel, their combined ESL and ESR is further reduced. FIG. 3B illustrates two capacitors 352 and 358, and their equivalent ESL and ESR models in parallel. As can be seen from FIG. 3B, parasitic inductances 354 and 360, are in parallel. When inductors are connected in parallel, their combined total inductance is less than any one of their individual inductances. In an embodiment, the parallel combination of bypass capacitors 242A, ... N, therefore, effectively reduces the ESL of the parallel combination of bypass capacitors 242A, ... N.

Similarly, parasitic resistances 356 and 362 are in parallel. When resistors are connected in parallel, their combined total resistance is less than any one of their individual resistances. In an embodiment, the parallel combination of bypass capacitors 242A, ... N, therefore, effectively reduces the ESR of the parallel combination of bypass capacitors 242A, ... N.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A data switch for use in a Power over Ethernet (PoE) communications system, comprising:
    a plurality of Ethernet ports that each comprise a transmit and receive port; and
    a protection circuit comprising:
        a positive diode array comprising a first plurality of diodes that each include a cathode and an anode, wherein the anodes of the first plurality of diodes are coupled to the plurality of Ethernet ports;
        a positive surge bus coupled between the cathodes of the first plurality of diodes and a bulk capacitor;
        a negative diode array comprising a second plurality of diodes that each include a cathode and an anode, wherein the cathodes of the second plurality of diodes are coupled to the plurality of Ethernet ports; and
        a negative surge bus coupled between the anodes of the second plurality of diodes and ground.

2. The data switch of claim 1, wherein the bulk capacitor is configured to provide a low impedance path to ground for low frequency surge events coupled to any one of the plurality of Ethernet ports.

3. The data switch of claim 2, wherein the bulk capacitor is comprised of a plurality of bypass capacitors coupled together in parallel.

4. The data switch of claim 1, wherein the positive diode array and the negative diode array are deposited on multiple substrates.

5. The data switch of claim 1, further comprising a transient voltage suppression (TVS) diode coupled between the positive surge bus and ground.

6. The data switch of claim 1, wherein at least one of the plurality of Ethernet ports includes a first transformer configured to transmit data to a powered device and a second transformer configured to receive data from a powered device.

7. The data switch of claim 6, wherein a center tap of the first transformer is coupled to an anode of one of the first plurality of diodes and a cathode of one of the second plurality of diodes.

8. The data switch of claim 6, wherein a center tap of the second transformer is coupled to an anode of one of the first plurality of diodes and a cathode of one of the second plurality of diodes.

9. A Power over Ethernet (PoE) protection circuit, comprising:
    a positive diode array comprising a first plurality of diodes that each include a cathode and an anode, wherein the anodes of the first plurality of diodes are coupled to the plurality of Ethernet ports that each comprise a transmit and receive port;
    a positive surge bus coupled between the cathodes of the first plurality of diodes and a bulk capacitor;
    a negative diode array comprising a second plurality of diodes that each include a cathode and an anode, wherein the cathodes of the second plurality of diodes are coupled to the plurality of Ethernet ports; and
    a negative surge bus coupled between the anodes of the second plurality of diodes and ground.

10. The PoE protection circuit of claim 9, wherein the bulk capacitor is configured to provide a low impedance path to ground for low frequency surge events coupled to any one of the plurality of Ethernet ports.

11. The PoE protection circuit of claim 10, wherein the bulk capacitor is comprised of a plurality of bypass capacitors coupled together in parallel.

12. The PoE protection circuit of claim 9, wherein the positive diode array and the negative diode array are deposited on multiple substrates.

13. The PoE protection circuit of claim 9, further comprising a transient voltage suppression (TVS) diode coupled between the positive surge bus and ground.

14. The PoE protection circuit of claim 9, wherein at least one of the plurality of Ethernet ports includes a first transformer configured to transmit data to a powered device and a second transformer configured to receive data from a powered device.

15. The PoE protection circuit of claim 14, wherein a center tap of the first transformer is coupled to an anode of one of the first plurality of diodes and a cathode of one of the second plurality of diodes.

16. The PoE protection circuit of claim 14, wherein a center tap of the second transformer is coupled to an anode of one of the first plurality of diodes and a cathode of one of the second plurality of diodes.

* * * * *